US006558431B1

United States Patent
Lynch et al.

(10) Patent No.: US 6,558,431 B1
(45) Date of Patent: May 6, 2003

(54) STORING VALID AND INVALID MARKUP LANGUAGE IN STRICT AND RELAXED TABLES RESPECTIVELY

(75) Inventors: Kevin M. Lynch, San Francisco, CA (US); Narciso B. Jaramillo, Fremont, CA (US); Hava B. Edelstein, San Francisco, CA (US); Benjamin G. Fuller, Campbell, CA (US)

(73) Assignee: Macromedia, Inc., San Francisco, CA (US)

( * ) Notice: Subject to any disclaimer, the term of this patent is extended or adjusted under 35 U.S.C. 154(b) by 0 days.

(21) Appl. No.: 09/151,605

(22) Filed: Sep. 11, 1998

(51) Int. Cl.[7] ............................................... G06F 15/00
(52) U.S. Cl. .................... 715/513; 715/501.1; 345/760; 717/110; 717/112; 717/113
(58) Field of Search ............................... 707/501.1, 513; 345/760; 717/111–113

(56) References Cited

U.S. PATENT DOCUMENTS

| | | | | |
|---|---|---|---|---|
| 5,845,299 A | * | 12/1998 | Arora et al. | 707/513 |
| 5,911,145 A | * | 6/1999 | Arora et al. | 707/514 |
| 6,009,441 A | * | 12/1999 | Mathieu et al. | 707/516 |
| 6,038,573 A | * | 3/2000 | Parks | 707/513 |
| 6,055,544 A | * | 4/2000 | DeRose et al. | 707/104 |
| 6,061,697 A | * | 5/2000 | Nakao | 707/513 |
| 6,076,108 A | * | 6/2000 | Courts et al. | 709/227 |
| 6,209,095 B1 | * | 3/2001 | Anderson et al. | 713/176 |
| 6,253,204 B1 | * | 6/2001 | Glass et al. | 707/102 |
| 6,343,302 B1 | * | 1/2002 | Graham | 707/501.1 |

OTHER PUBLICATIONS

Creating Commercial Web Pages, Lemay et al, SAMS, 8/96, p. 4–7.*
Surfing the Internet with Internet Explorer, Miller, M., Que Publishing, Mar. 19, 1998, p. 1–11.*
HTML 4 Unleashed, Professional Reference Edition, Darnell, R., McMillan Computer Pub., 1/198, p. 1–4.*
Lewis, Adobe PageMill 2.0 Handbook, Hayden Books, 1996, p. 244–249.*
Laura Lemay's Web Workshop JavaScript, Lemay et al, Sams.net, 1996, p. 3–6.*
Bovier, D., "Versions and Standards of HTML", IEEE, p. 9–15.*

\* cited by examiner

*Primary Examiner*—Stephen S. Hong
*Assistant Examiner*—Cesar B. Paula
(74) *Attorney, Agent, or Firm*—Fulbright & Jaworski L.L.P.

(57) ABSTRACT

The inventive editor allows web authors to edit HTML visually while preserving the HTML source document. The editor preserves the structure and format of the HTML, and permits simultaneous modeless visual and source document editing. When an edit is made with the invention, only the HTML source around that edit is updated, rather than rewriting the whole HTML source document. Furthermore, when an edit is made, the new HTML source code is outputted in a format that is specified by the user. In order to preserve the format of the document, format information is stored in the parsed tree. The format of the node is preserved when its source is regenerated; edits to the node will reformat it according to user preferences. In order to preserve the structure of the document, invalid HTML structures are maintained and not corrected. The invention will either support the invalid structure by reflecting such structure in the parsed tree, and thus allow for editing of the structure, or the invention will not support such a structure, and represent such structures as invalid nodes. Moreover, the invention also maintains structure while editing, as the structure and format of the document is only minimally modified during editing, i.e. only the nodes affected by the edits are restructured and reformatted, and the remainder of the document is unmodified.

60 Claims, 8 Drawing Sheets

STORING VALID AND INVALID MARKUP LANGUAGE IN STRICT AND RELAXED TABLES RESPECTIVELY

TECHNICAL FIELD OF THE INVENTION

This application relates in general to the Internet web pages, and in specific to a visual web authoring tool.

BACKGROUND OF THE INVENTION

In order to have complete control over their web site designs, web authors have been creating web sites by writing HTML source in text editors. Recently, visual HTML editors have been introduced with the intention of improving web authoring productivity. These visual editors haves not found much success with professional web authors since they completely re-write the HTML source document when the document is loaded into the visual editor. Note that HTML authors prefer to be able to edit code by hand even while using a visual editor, or after the code has been edited visually by someone else.

Figure 1:
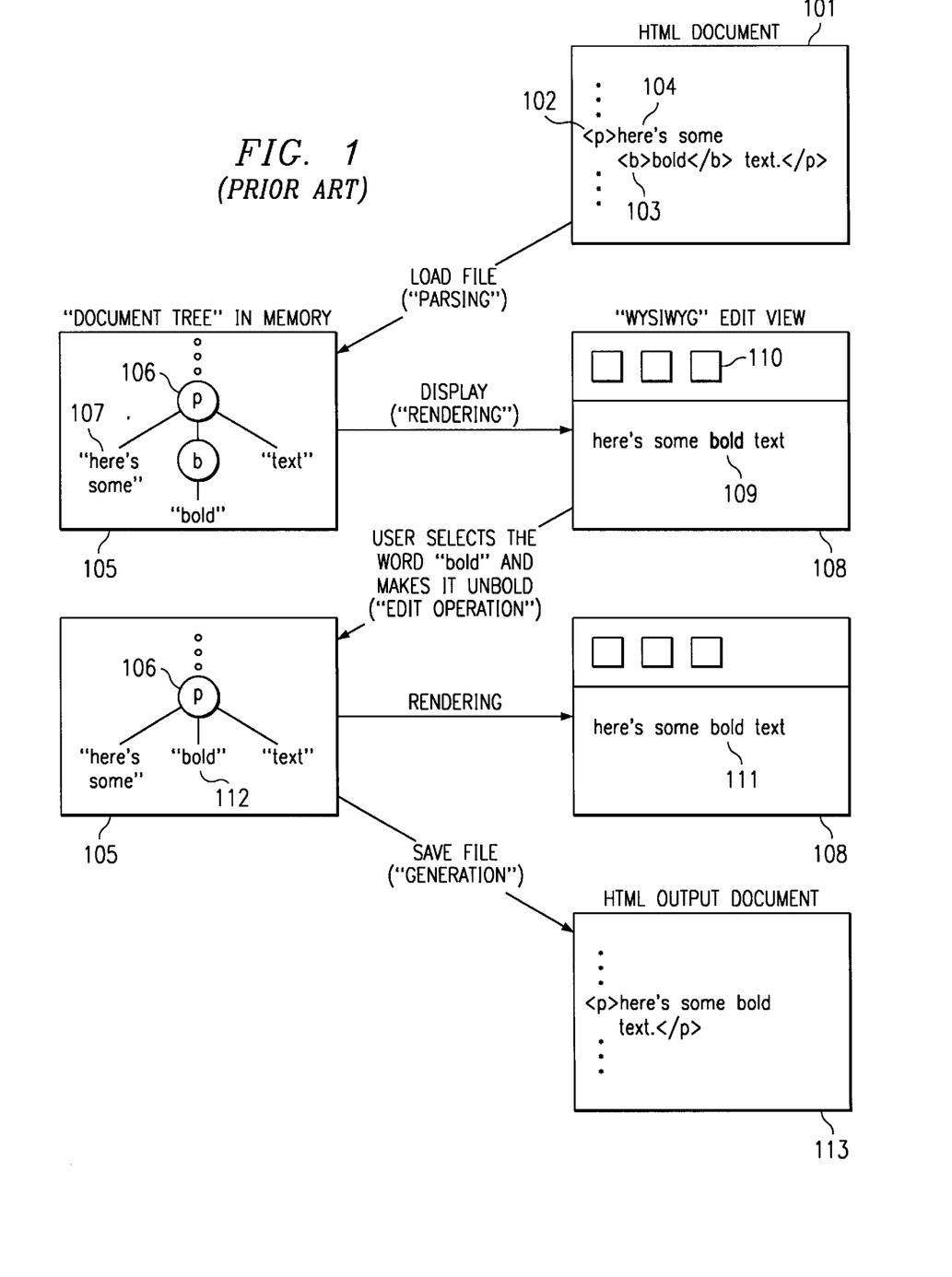
FIG. 1 depicts the operations of a prior art editor on an HTML document.

FIG. 1 depicts the operations of a prior art editor on HTML document 101. The HTML document 101 includes HTML mark up tags, such as paragraph tags 102 and bold tags 103. Note that these tags are by way of example only as other tags exist, such as size, color, font, etc. These tags indicate to the browser the manner in which to display the text 104 or other objects to the browser user. The editor begins by loading the document into memory, and parsing the document 101 into an internal data structure 105, which may be a tree structure. The nodes in the tree 105 represent the HTML tags, while the children 107 of the nodes are either other nodes or text. The editor then displays or renders the tree to the editor user as it would be viewed on a browser. This view 108 is known as the rendered view or WYSIWYG (what you see is what you get) view. The text that is marked with bold tags 103 is displayed in bold format 109.

The editor allows a user to edit the HTML document as displayed in the rendered view 108. For example, suppose the user edits the document to remove the bold format from the text. The user selects the rendered word bold 109, and selects the unbold button 110. The editor then changes the tree 105 by discarding the bold (b) node and making the text "bold" a child of the paragraph (p) node 106. The editor then renders the tree into the WYSIWYG view 108 with the text unbolded 111. Note that the tree 105 is stored in memory and is not viewed by the user. At the conclusion of editing, the user is prompted as to whether to save the changes. If the user decides to save the changes, the editor regenerates the HTML document 113 from the tree 105.

Figure 2:
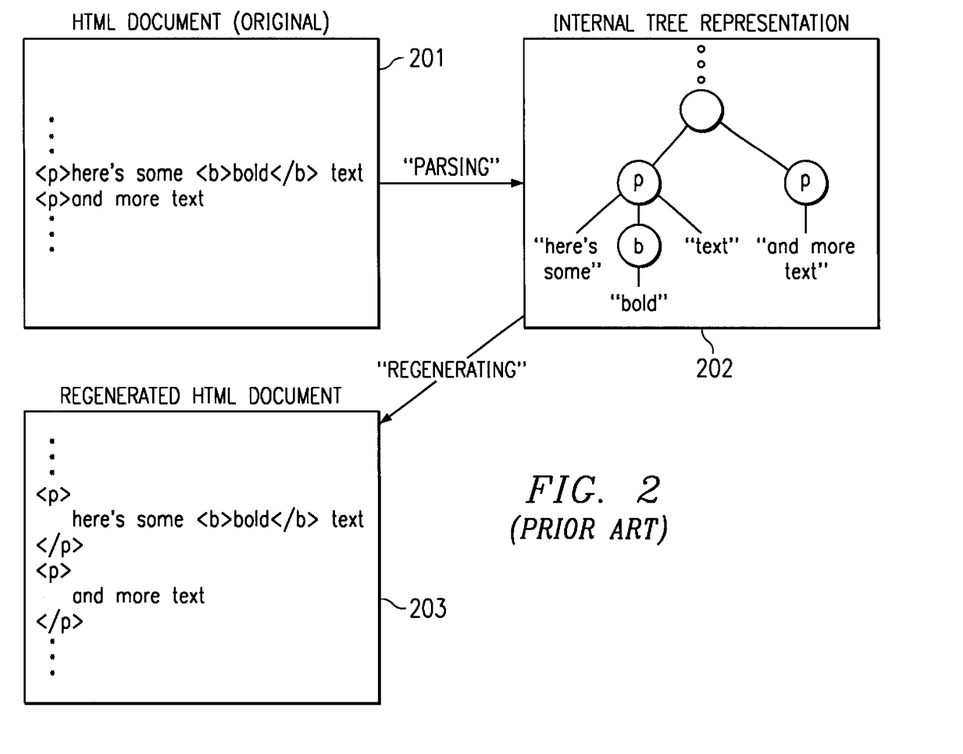
FIG. 2 depicts the problem of preservation of format of the editor of FIG. 1.

The prior art approach as depicted in FIG. 1 has several problems. FIG. 2 depicts the problem of preservation of format. As shown in FIG. 2, the HTML document 201, as created by the author, does not have each paragraph end with a </p>. During editing, the document 201 would be parsed into tree 202. At the conclusion of editing, the HTML document 203 would be regenerated. However, during regeneration, the editor would reform the document with the </p> at the end of each paragraph. The editor does not track the format of the tags by the author. Thus, when the editor reforms the document, the editor makes assumptions as to the use of tags. Therefore, whereas the original document lacked the ending </p> tags, the reformed document has the ending </p> tags. Moreover, the editor places the opening and ending paragraph tags on separate lines. Note that this problem arises because the editor does not preserve any of the formatting information from the original document. Consequently, HTML authors do not have control over their documents, as the document that they created will appear different from the edited, reformatted document. This makes reading, reviewing, and making further changes to the document difficult, since the document does not appear to be the same document as that created by the author.

Figure 3:
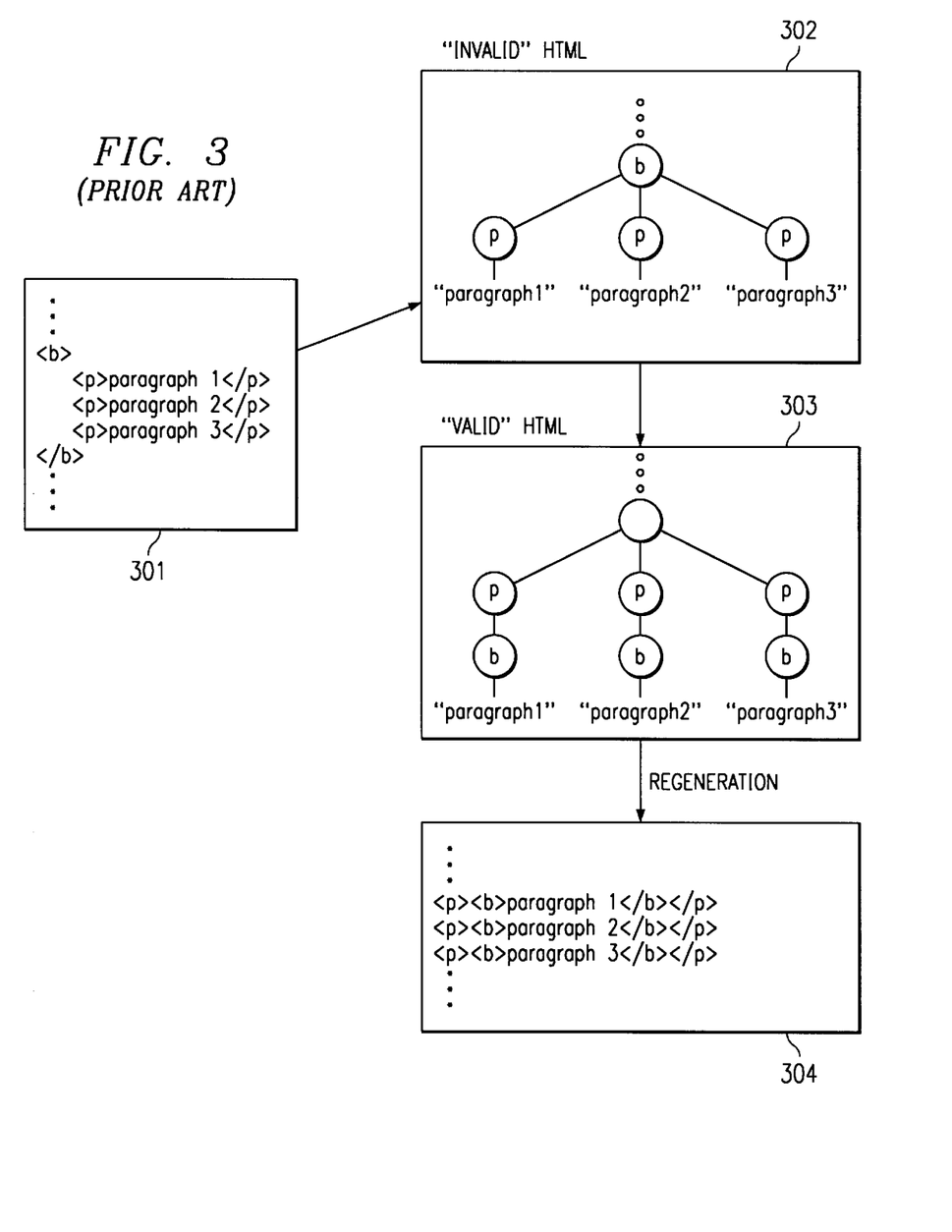
FIG. 3 depicts the problem of preservation of structure with the editor of FIG. 1.

FIG. 3 depicts another problem with the prior art approach shown in FIG. 1, the preservation of structure. As shown in FIG. 3, the author has bolded several paragraphs by placing the appropriate tags so as to surround the desired paragraphs 301. However, the HTML language standard only allows nested tags to appear in a particular order, e.g. block tags must surround character tags. Thus, the bold tag cannot be placed around a paragraph tag, but rather should be placed inside the paragraph tags. Note that HTML browsers would tolerate such an error, and would render the web page in a correct manner. However, the editor would correct the error during parsing the document 301 into the tree 302. Note tree 302 corresponds to the source document as if the editor did not correct the error. The editor would not have placed the bold tags from the parent node position of the paragraph nodes, and instead create new bold nodes as child nodes of the paragraph nodes 303. During regeneration, the reformatted document 304 would have multiple bold tags that are located within the paragraph tags, instead of a single set of bold tags surrounding the paragraph tags. Thus, upon a subsequent edit, if the author desires to remove the bold tags, then the author will have to remove each of the newly created tags from within each paragraph, instead of removing only a single bold tag.

Figure 4A:
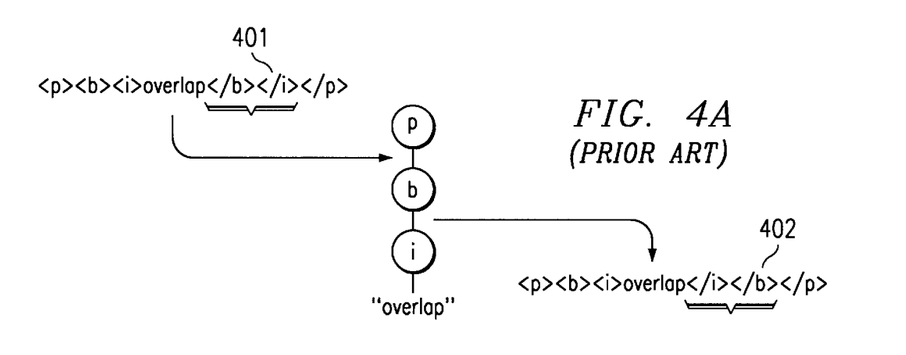
FIGS. 4A and 4B depict specific structure problems with the editor of FIG. 1.
Figure 4B:
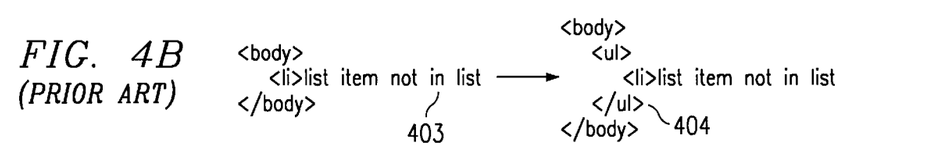

FIG. 4A depicts another aspect of the problem shown in FIG. 3, i.e. the structure of the original document is not well preserved. In FIG. 4A, overlapping tags 401 are corrected by the editor, so that tags are in order 402 from the inside out. FIG. 4B depicts a list item that is not in the list 403. In this case, the editor will place UL tags 404 around the item. Thus, again the author has lost control over the created document, which has been altered by the editor.

Figure 5:
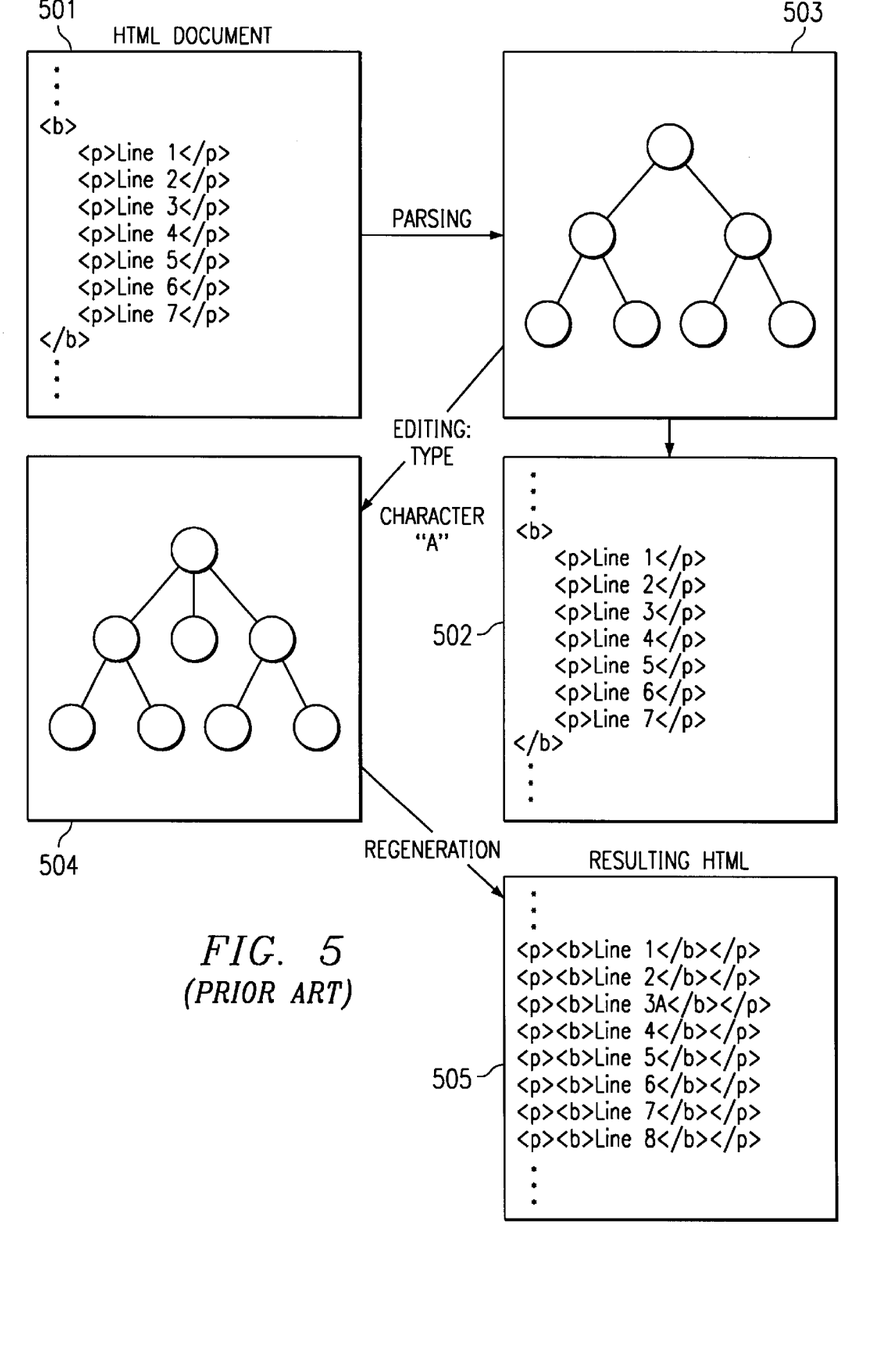
FIG. 5 depicts a prior art editor that maintains a copy of the original document during a portion of the processing.

FIG. 5 depicts a prior art editor that maintains a copy 502 of the original document 501 during a portion of the processing. After the editor loads and parses the document 501 into tree 503, the editor maintains copy 502. However, when edited 504, the document 502 is reformatted and restructured.

Figure 6:
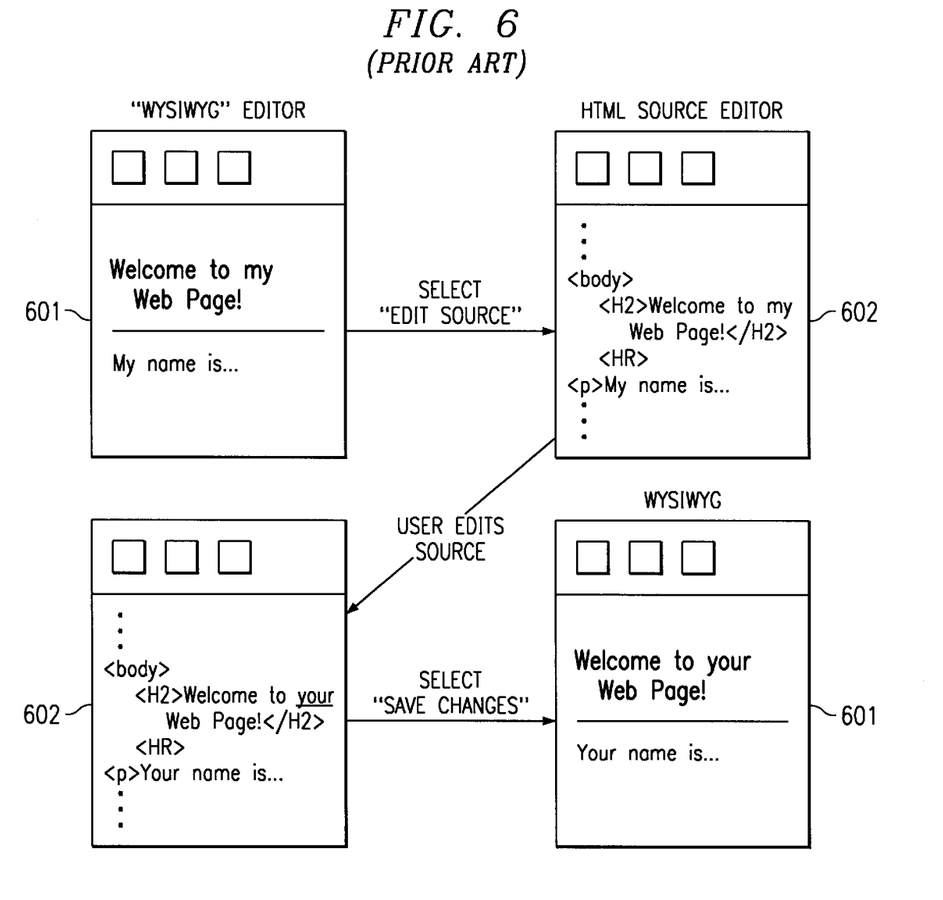
FIG. 6 depicts the problem of modal editing of the editor of FIG. 1.

FIG. 6 depicts the problem of modal editing of the prior art editor of FIG. 1. Some prior art editors do not allow for editing of the document. In other words, all editing is performed in the visual editor, and the source document is hidden from the author. Thus, the only mode of editing is in the visual editor. However some prior art editors allow editing of the source document, but it is model: either the source document or renderer version can be edited, but not both at the same time. In switching back and forth between the two modes 601, 602, the document would be reformatted and restructured such that it would be unrecognizable by the author.

Therefore, there is a need in the art for an editor that allows web authors to edit HTML visually while preserving the HTML source document. This would preserve the structure and the format of the HTML document, while allowing modeless editing.

SUMMARY OF THE INVENTION

These and other objects, features and technical advantages are achieved by a system and method which allows web authors to edit HTML visually while preserving the HTML source document. Thus, the structure and format of the HTML document is preserved, and modeless editing is permitted. The invention preserves the source document exactly as it is written when it is opened in the visual editor. Moreover, when an edit is made with the invention, only a portion of the HTML source document around that edit is updated, rather than rewriting the whole HTML source document. Furthermore, when an edit is made, the new HTML source code in the edited range is outputted in a format that is specified by the user.

In order to preserve the format of the document, format information is stored in the parsed tree. Thus, each node in the tree includes information on the format of the text and objects of the node. Note that formatting information may also be stored in the text in the tree. Any edits on that particular node will result in changing the information of that node only (if possible). Other nodes will not be reformatted unless necessary. Moreover, the edited node will be reformatted according to the user's preferences. For example, the user's preferences may specify line breaks before each paragraph. Thus, when the node is reformatted, the editor will place line breaks before each paragraph.

In order to preserve the structure of the document, invalid HTML structures are maintained and not corrected (unless the user so specifies). The invention will either support the invalid structure by reflecting such structure in the parsed tree, and thus allow for editing of the structure, or the invention will not support such a structure. With unsupported structures, the authors are offered a choice. Either the invalid and supported structure may be maintained, and thus remain un-editable, or the structure may be corrected, and thus made editable. Those invalid, unsupported structures that the author has chosen to maintain are represented in the tree as invalid nodes. Note that these invalid, unsupported structures may be manually deleted by the user in the visual editor, thus making their document valid again. Further note that the user can choose to have all correctable invalid HTML be automatically rewritten (not preserved) to make it fully valid. The invention supports most common types of invalid structures such as text mark up tags around block tags (e.g. bold around paragraph), content directly in UL or OL list, an LI tag outside of list, A tags inside other A tags, etc. Moreover, the invention also maintains structure while editing, as the structure of the document is only minimally modified during editing, i.e. only the nodes affected by the edits are restructured, and the remainder of the document is unmodified. Thus, the structure of the document is maintained.

The invention also supports modeless editing. The copy of the source document and/or the rendered window may be edited, and the changes made in one are reflected in the other. Moreover, both the source document and the rendered window may be displayed to the author simultaneously. Selections and edits in one will be reflected in the other. Note that changes made in the rendered window appear immediately in the source document window, while changes in the source document window appear in the rendered window after clicking out of the source document.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 7:
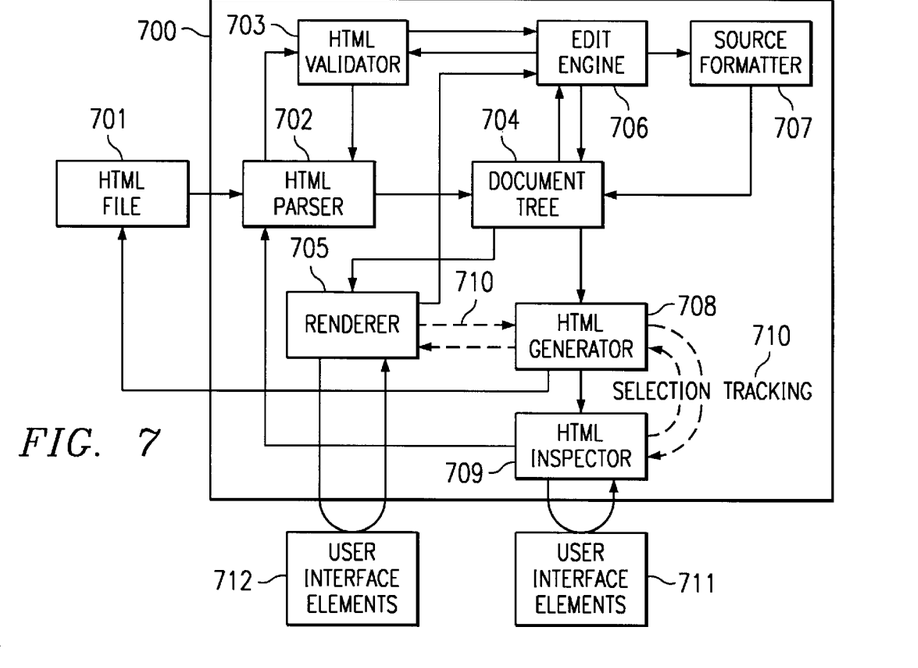
FIG. 7 depicts the inventive editor.

FIG. 7 depicts the inventive editor 700, which processes an input HTML document 701. The editor loads the file, which is read and interpreted by the parser 702. The parser 702 uses the validator 703 during interpretation. The validator determines which structures within the document 701 are valid and which are invalid. The parser forms the internal tree 704 from the HTML document 701. The document tree 704 comprises nodes and child nodes, with formatting information and other information attached to each node. Note that the nodes can be text nodes or tag nodes. Thus, the text is stored in the tree. The renderer 705 uses the document tree 704 to form a screen display page, like a browser would form. The user/author may interact with or edit the displayed page via user interface elements in box 712. Any edits received by the editor are delivered to the edit engine 706. The edit engine 706 transforms or modifies the document tree 704 according to the user inputs and the information stored in the document tree 704. Only the portions of the tree referenced by the user edits are reformatted. The source formatter 707 is prompted by the edit engine to insert the proper formats, such as line breaks, according to the user's original preferences, as stored in an external preference file. The format information, either in the nodes or the external file, includes instructions to add/move linebreaks, wordwrap text, and tag capitalization, etc. Other types of format information can be used so long as it describes the appearance of the source document not the structure. Note that the formatter only operates on edited nodes (or nodes within the range of the edit), and thus will not change the format information stored on other nodes. The edit engine manipulates the basic structure of the tree, while the reformatter inserts formatting information as necessary into the tree so that the HTML source, when later regenerated, will conform to the user's preferences. Note that during regeneration, the format information stored in the nodes is used, and on a node by node basis, this information may be from the original source document, or it may reflect the preferences from the external file.

The edit engine also uses the validator 703 to ensure that edits performed on the tree 704 are performed in the correct manner. Note that the editor 700 will maintain invalid HTML structures when reading in a document or interpreting the result of an edit made in the source document view. However, the editor will always create only valid HTML when edits are made in the rendered WYSIWYG view. The rationale for that is the author can recognize which invalid HTML will work and which will not work; however, the automatically generated HTML cannot be verified in the same manner, and thus, automatically generated HTML should be validly created. Note that the portion of the tree that is edited in the rendered view is changed to make it valid, but the changes are minimized as much as possible.

The editor 700 uses generator 708 to form the HTML document from the tree 704. The generator is used to create the HTML document that is saved out to the original HTML source document when editing is completed. The generator 708 also creates the HTML source document that is sent to the HTML inspector 709, which is then editable by the user/author. The inspector 709 is a text editor which makes changes to the source document as desired by the user/author. Note that the source document in the inspector 709 is not the original document, but rather a copy stored in memory. Thus, the original is preserved until conclusion of the editing process. Moreover, the edited document may be saved as a later version of the original document.

The inventive editor 700 has two separate edit cycles. The first is when a change is made by the user/author in rendered view or WYSIWYG mode. In this mode, the user inputs changes via interaction 712. These changes are passed by the renderer 705 to the edit engine 706, which then modifies the tree 704, then calls the source reformatter 707 to reformat the portion of the tree that was affected by the edit. After the tree has been modified, the renderer 705 updates the displayed image so as to reflect the changes to the tree. The generator 708 also regenerates the updated source document from the document tree 704, and sends the source document to the HTML inspector 709. Thus, the source document in the inspector also reflects the changes made by the edits to the rendered version. The second edit cycle is when a change is made by the user/author in HTML inspector mode or the source document view. In this mode, the user inputs changes via interaction 711. These changes are passed from the inspector 709 to the parser 702, which along with the validator 703, re-parses the whole file to form an updated tree 704. The updated tree 704 is then passed to renderer 705 and generator 706, which then reflect the changes made to the tree in new versions of the rendered image and document. Note that in the second edit cycle, invalid HTML that is unsupported is always preserved, never rewritten, regardless of the user's preferences. This is so that the user can work back and forth between the HTML inspector and the rendered view without the source document changing in ways the user did not intend (e.g. by accidentally leaving off a close tag). Thus, invalid unsupported HTML is only rewritten when loading a document, not when it is reparsed during an HTML inspector edit.

Figure 8A:
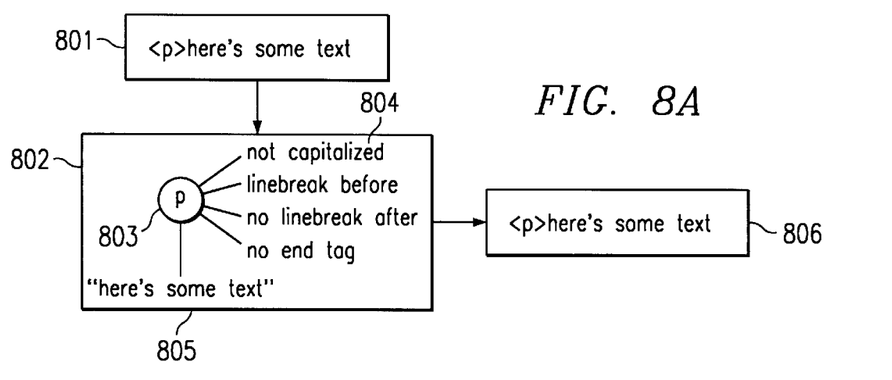
FIGS. 8A and 8B depict the operations of the inventive editor of FIG. 7 on an instance of HTML.
Figure 8B:
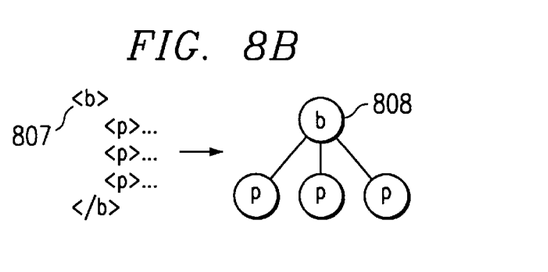

The inventive editor 700 maintains invalid HTML structures when reading in a file ("parsing"), but always creates valid HTML structures when the user edits the document tree in the WYSIWYG mode. In order for the editor to create valid HTML, it must know what HTML structures are valid; in order for it to preserve and operate on invalid HTML, it must know which invalid structures are supported and which are not. To do this, it uses the validator 703. The validator comprises two tables. The first table is a "strict" validation table, which corresponds directly to the standard DTD (Document Type Definition) defined by the HTML language standard. The DTD defines what HTML structures are valid by specifying, for each tag, what other tags are valid inside that tag; this is known as that tag's "content model". The content models of all standard tags together determine whether a given HTML structure is valid. For example, the DTD specifies that a paragraph tag can contain text and text markup tags (like bold), but a bold tag cannot contain a paragraph tag. This strict validation table is used during editing, in order to make sure that HTML created by the editor is always valid. The validator's second table is a "relaxed" validation table, which is similar to the "strict" DTD-based table, but contains more permissive content models. This table is used by the parser to determine which invalid HTML structures should be directly preserved in the document tree when a file is read in. For example, this table could define that anything can be inside a bold tag 807, as shown in FIG. 8B.

Figure 9:
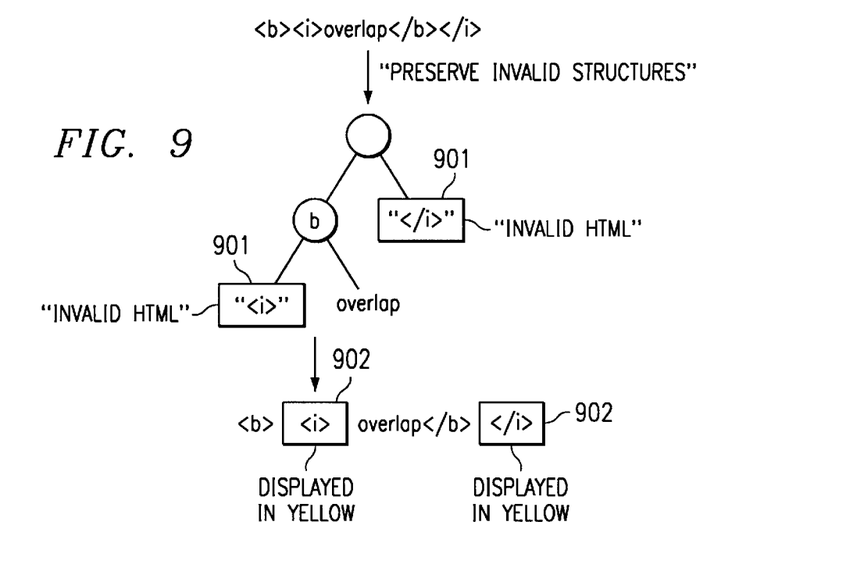
FIG. 9 depicts the marking of invalid and unsupported HTML by the inventive editor of FIG. 7.

Note that some HTML structures are both invalid and unsupported. This HTML is not allowed by the relaxed validation table. Thus, when the parser 702 is operating on such HTML, the parser will indicate to the user that the HTML is unsupported. Depending on the user's pre-set preferences, the parser will either correct the invalid HTML to make it valid, or maintain it as-is. Note that the user specifies this in advance, and not as the document is read in. The user may also elect to have the invalid and unsupported HTML maintained. Since this HTML is also unsupported, then the editor cannot operate on it. The parser would create an invalid markup node to contain the unsupported HTML. The renderer and the generator indicate to the user the presence of the invalid node by displaying the unsupported portions in yellow or some other indicator which shows that the HTML is invalid. For example, as shown in FIG. 9, the structure of overlapping tags is unsupported. The parser, after consulting the validator, marks one of the nodes (tags) as invalid and unsupported 901. The generator notes invalid nodes as yellow background around the invalid portion of the document 902. The renderer would similarly mark portions of the displayed image in yellow. Note that the parser uses heuristics for determining which item should be marked invalid. The heuristics indicate a preference in marking the lower significance tag as invalid. The heuristics limit the invalidity to small portions of text and thus prevent having to mark the entire paragraph as invalid. Note that marking invalidity of HTML occurs when the user has deactivated the rewriting of invalid HTML. Further note that if HTML is rewritten to be valid, no invalid markup appears, although a warning may optionally be shown to the user according to the user's preferences.

The document tree 704 of the inventive editor 700 maintains the formatting information with each tag or text node. As shown in FIG. 8A, the parser reads the HTML document 801 and forms a tree 802. Note that for simplicity only a single paragraph and node 803 are shown, however documents and trees could comprise a plurality of paragraphs and nodes, respectively. Stored along with node 803 is format information 804, which indicates the format of the HTML source document. Note that this information 804 is in addition to text 805, and other tags, e.g. bold, font, and/or size, which is used to form the HTML page. Information 804 relates to the format of the HTML source document. The information 805 is used by the renderer in the formation of the rendered view. The information 804, 805 is used by the generator in forming the document 806 for use by the inspector or saving the edited document. The information 804 is manipulated by the source formatter while the user edits the document in order to fit the user's source formatting preferences during those edits. The information 804 is formed by the parser 702.

Figure 10:
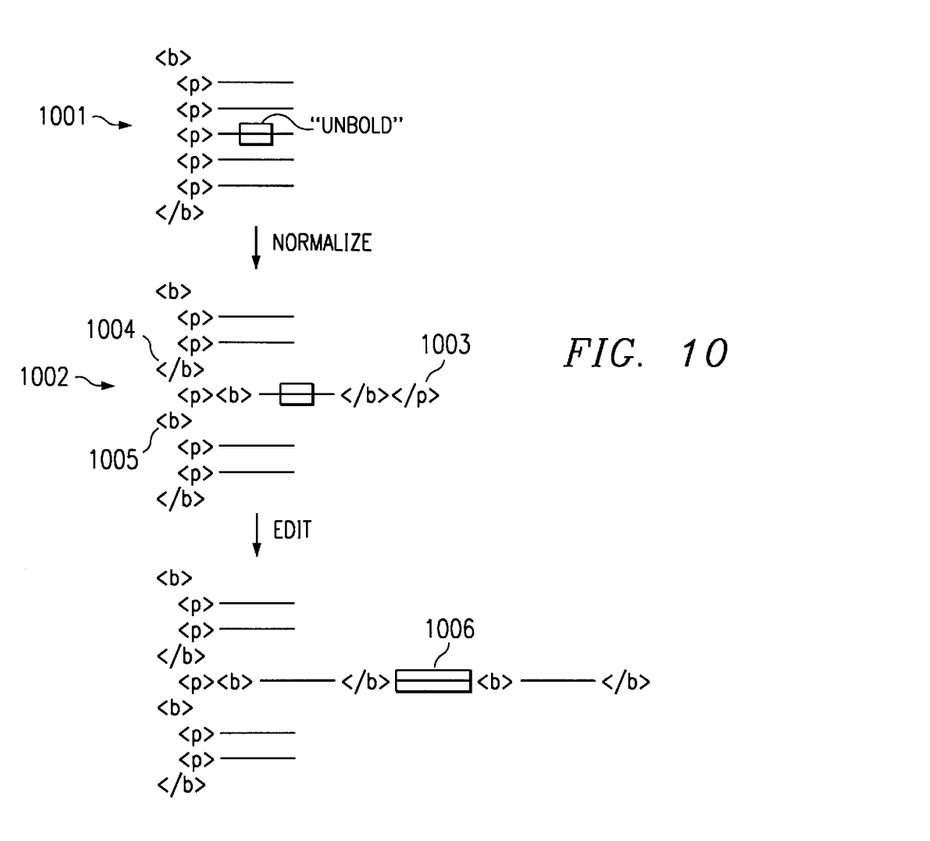
FIG. 10 depicts the normalization of invalid HTML by the inventive editor of FIG. 7.

Note that each edit affects a range of the tree, and the individual edits expect to operate on valid HTML, whereas the unedited portions of the document may be in invalid but supported HTML. Thus, in order for edits to occur, any invalid HTML within the range of the edit must be corrected prior to editing. The correcting or normalizing is only performed within the range of the edit, while the remainder of the HTML document is maintained. For example, FIG. 10 depicts an edit where a portion of text in an invalid, but supported HTML document 1001 is going to be unbolded. The document is invalid, but supported, as the bold tags are outside of the paragraph tags. The range of the edit is the paragraph containing the selected portion. Other edits may have different ranges depending upon the nature and scale of the edit. During normalization, closing 1004 and opening 1005 bold tags are added to the portions of the document outside of the range. Thus, the invalid, but supported structure is maintained. However, the portion within the range 1003 is corrected such that the bold tags are inside of the paragraph tags. The edit 1006 is then made to the corrected portion. The edit engine 706 handles the normalization as necessary before each edit.

Figure 11:
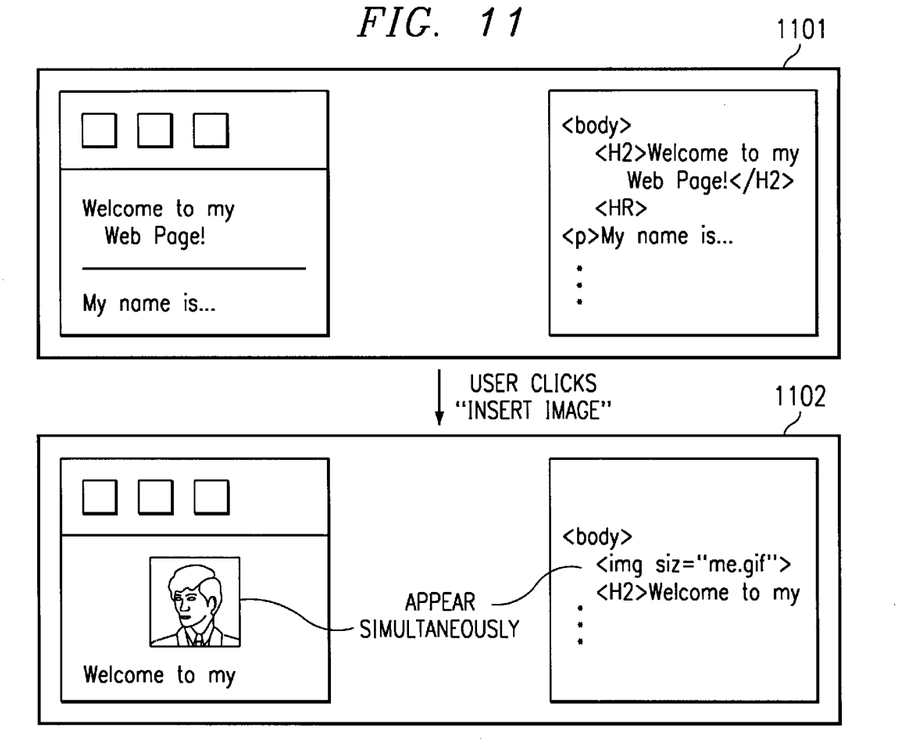
FIG. 11 depicts the modeless editing operation by the inventive editor of FIG. 7.

Although the invention has been described in terms of modal operation, the invention can operate modelessly by as shown in FIG. 11. As shown in FIG. 11, the inventive editor 700 allows for both WYSIWYG and source document edit windows to be viewed by the user/author at the same time 1101. The inventive editor 700 uses selection tracking 710 through the two windows. This tracking, and the regeneration of the source document after every edit in the rendered view and the reparsing of the source document after editing in the HTML inspector, allows both windows to be viewed and edited at the same time. Any selection or edit 1102 in one window is also made in the other window. If some text is selected for editing in the rendered view, then the same text will also appear as selected in the document window. For example, a portion of text is selected in the rendered window. The relevant portion of the document tree is selected internally. During generation of the inspector document from the tree, the character numbers for the beginning and end of the selected portions are computed. These numbers are passed to the inspector as character offsets for indicating the selected portion, which are displayed to the user in an appropriate manner as the selected portion. A similar approach is used to transpose a selection made in the inspector to the renderer. The file is parsed, then regenerated into the HTML inspector. During regeneration, the selection in the WYSIWYG view is also computed.

Figure 12:
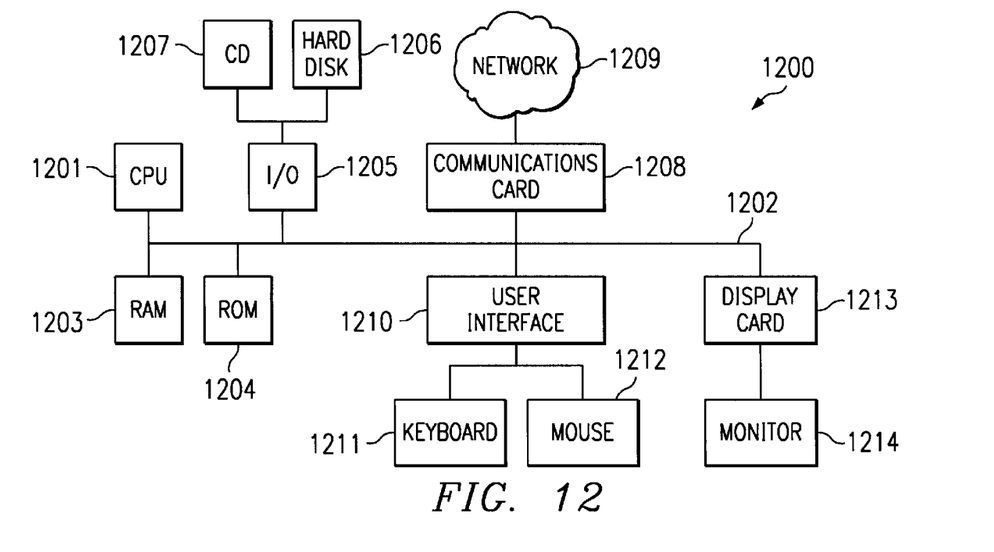
FIG. 12 depicts a computer system for operating the inventive editor of FIG. 7.

FIG. 12 depicts a computer system 1200 adapted to use the present invention. Central processing unit (CPU) 1201 is coupled to bus 1202. CPU 101 may be any general purpose CPU, such as an Intel Pentium processor. However, the present invention is not restricted by the architecture of CPU 1201 as long as CPU 1201 supports the inventive operations as described herein. Random access memory (RAM) 1203 and read only memory (ROM) 1204 hold user and system data and programs as is well known in the art. Input/output (I/O) adapter 1205 connects storage devices, such as hard drive 1206 or CD ROM 1207, to the computer system. Communications card 1208 couples the computer system to a local, wide-area, or Internet network 1209. User interface card 1210 couples user input devices, such as keyboard 1211 and pointing device 1212, to the computer system 1200. Finally, display card 1213 controls the display on display device 1214.

Note that this invention has been described in terms of HTML, however the invention would operate with other languages such as XML, SGML. The format aspects of invention could also apply to normal programming languages, such as C or C++ with an IDE that allows high-level program manipulation that affects the underlying code.

Although the present invention and its advantages have been described in detail, it should be understood that various changes, substitutions and alterations can be made herein without departing from the spirit and scope of the invention as defined by the appended claims.

What is claimed is:

1. A system for modifying a program written in a language, wherein the system edits the program in at least one of a text mode which presents the program in a text manner and a visual mode which presents the program in a simulated runtime mode, the system comprising:

an internal representation of the program which includes format information of the program;

a strict table which defines valid program structures according to a standard for the program;

a relaxed table which defines supported program structures, wherein at least one supported program structure is not listed on the strict table as a valid program structure;

a parser that loads the program and forms the internal representation using the relaxed table, and uses the relaxed table in interpreting modifications to the internal representation in satisfying edit requests made in the text mode; and an edit engine that uses the strict table in performing modifications to the internal representation in satisfying edit requests made in the simulated runtime mode.

2. The system of claim 1, further comprising:

a source formatter that reformats modifications made by the edit engine to conform to user formatting preferences.

3. The system of claim 1, further comprising:

a renderer that forms a viewable version of the program in the simulated runtime mode, receives the edit requests from a user, and delivers the edit requests to the edit engine.

4. The system of claim 1, further comprising:

a generator for producing a modified version of the program in the language from the internal representation using the format information; and a text editor that forms a viewable version of the program in the text mode from the modified version, receives the edit requests from a user, and delivers the edit requests to the parser.

5. The system of claim 4, wherein:

the generator forms a version of the program to be saved from the internal representation, upon completion of editing.

6. The system of claim 1, wherein:

the parser marks a program structure that is not listed on the strict table and the relaxed table as an invalid, unsupported structure on the internal representation, which cannot be modified by the system.

7. The system of claim 6, wherein:

the system indicates to a user that the invalid, unsupported structure is not supported by the system.

8. The system of claim 1, wherein:

the system maintains invalid program structures that are listed on the relaxed table and creates valid program structures listed on the strict table in satisfying the edit requests from a user, wherein said invalid program structures are defined by nesting of individual program elements.

9. The system of claim 1, wherein:

the language is HTML.

10. The system of claim 1, wherein:

the internal representation is a tree; and the tree comprises a plurality of nodes with the format information attached to each node.

11. The system of claim 10, wherein:

a portion of the tree encompassing a modification is normalized to conform to the strict table prior to performing the modification.

12. The system of claim 1, wherein:

a portion of the program selected in one mode of the text mode and the simulated runtime mode, is also selected in the other mode.

13. The system of claim 1, wherein:

a viewable version of the program in the text mode and a viewable version of the program in the simulated runtime mode are simultaneously viewable and editable by a user.

14. A method implemented in a computer for modifying a program written in a language, wherein the method edits the program in at least one of a text mode which presents the program in a text manner and a visual mode which presents the program in a simulated runtime mode, the method comprising the steps of:

providing a strict table which defines valid program structures according to a standard for the program;

providing a relaxed table which defines supported program structures, wherein at least one supported program structure is not listed on the strict table as a valid program structure;

forming an internal representation of the program which includes format information of the program using the relaxed table, via a parser;

interpreting modifications to the internal representation in satisfying edit requests made in the text mode using the relaxed table, via the parser; and performing modifications to the internal representation in satisfying edit requests made in the simulated runtime mode using the strict table, via an edit engine.

15. The method of claim 14, further comprising the step of:

reformatting modifications made by the edit engine to conform to user formatting preferences, via a source formatter.

16. The method of claim 14, further comprising the steps of:

forming a viewable version of the program in the simulated runtime mode, via a renderer; and receiving the edit requests from a user and delivering the edit requests to the edit engine, via the renderer.

17. The method of claim 14, further comprising the steps of:

producing a modified version of the program in the language from the internal representation using the format information, via a generator;

forming a viewable version of the program in the text mode from the modified version, via a text editor; and receiving the edit requests from a user and delivering the edit requests to the parser, via the text editor.

18. The method of claim 17, further comprising the step of forming a version of the program to be saved from the internal representation upon completion of editing, via the generator.

19. The method of claim 14, further comprising the step of:

marking a program structure that is not listed on the strict table and the relaxed table as an invalid, unsupported structure on the internal representation, which cannot be modified by the method, via the parser.

20. The method of claim 19, further comprising the step of:

indicating to a user that the invalid, unsupported structure is not supported by the method.

21. The method of claim 14, further comprising the steps of:

maintaining an invalid program structure that is listed on the relaxed table; and creating valid program structures listed on the strict table in satisfying the edit requests from a user.

22. The method of claim 14, wherein:

the language is HTML.

23. The method of claim 14, wherein:

the internal representation is a tree; and the tree comprises a plurality of nodes with the format information attached to each node.

24. The method of claim 23, further comprising the step of:

normalizing a portion of the tree encompassing a modification to conform to the strict table prior to performing the modification.

25. The method of claim 14, wherein:

a portion of the program selected in one mode of the text mode and the simulated runtime mode, is also selected in the other mode.

26. The method of claim 14, wherein:

a viewable version of the program in the text mode and a viewable version of the program in the simulated runtime mode are simultaneously viewable and editable by a user.

27. A system for modifying a program written in HTML language, wherein the system edits the program in at least one of a text mode which presents the program in a text manner and a visual mode which presents the program in a simulated runtime mode, the system comprising:

an internal representational tree of the program, which includes format information of the program, and is comprised of a plurality of nodes;

a strict table which defines valid program structures according to a standard for the program;

a relaxed table which defines supported program structures, wherein at least one supported program structure is not listed on the strict table as a valid program structure;

a parser that loads the program and forms the tree using the relaxed table, and uses the relaxed table in interpreting modifications to the tree in satisfying edit requests made in the text mode;

an edit engine that uses the strict table in performing modifications to the tree in satisfying edit requests made in the simulated runtime mode; and a source formatter that reformats modifications made by the edit engine to conform to user formatting preferences;

wherein the system maintains an invalid program structure that is listed on the relaxed table and creates valid program structures listed on the strict table in satisfying edit requests from a user.

28. The system of claim 27, further comprising:

a renderer that forms a viewable version of the program in the simulated runtime mode, receives the edit requests from the user, and delivers the edit requests to the edit engine;

a generator for producing a modified version of the program in the language from the tree using the format information; and a text editor that forms a viewable version of the program in the text mode from the modified version, receives the edit requests from the user, and delivers the edit requests to the parser.

29. The system of claim 27, wherein:

a portion of the tree encompassing a modification is normalized to conform to the strict table prior to performing the modification.

30. The system of claim 27, further comprising:

means for tracking selections between the modes such that a portion of the program selected in one mode of the text mode and the simulated runtime mode, is also selected in the other mode.

31. The system of claim 27, wherein:

a viewable version of the program in the text mode and a viewable version of the program in the simulated runtime mode are simultaneously viewable and editable by the user.

32. A computer program product having a computer readable medium having computer program logic recorded thereon for modifying a program written in a language, the computer program product comprising:

code for parsing the program into a text mode which presents the program in a textual view and a visual mode which presents the program in a simulated runtime view;

code for editing the simulated runtime view:
wherein edits made in the simulated runtime view cause corresponding edits in the textual view;
wherein the code for editing the simulated runtime view changes only the format of the textual view which corresponds to the portion of the program edited in the simulated runtime view, the format comprising word spacing, line spacing, and other information relating to a visual representation of the textual view; and
wherein the code for editing the simulated runtime view changes only the syntax structure of the textual view which corresponds to the portion of the program edited in the simulated runtime view, the syntax structure comprising the syntax, programming codes, and code relationships of the language.

33. The computer program product of claim 32 further comprising:

code for simultaneously displaying the textual view and the simulated runtime view, wherein selections made in one view cause associated selections to be made in the other view.

34. The computer program product of claim 33 further comprising:

code for editing the textual view, wherein edits to the textual view cause corresponding changes in the simulated runtime view.

35. The computer program product of claim 34 wherein the computer program product preserves edits made in the textual view unless subsequent edits are made to the same portion of the program in the simulated runtime view.

36. The computer program product of claim 32 wherein the format and syntax structure are preserved by said code for parsing when the program is one of loaded in or written out.

37. The computer program product of claim 32 further comprising:

code for verifying language syntax.

38. The computer program product of claim 37 further comprising:

code for displaying invalid language syntax distinct from valid language syntax.

39. The computer program product of claim 38 further comprising:

code for determining acceptable invalid syntax.

40. The computer program product of claim 39 further comprising:

code for determining changes to acceptable invalid syntax responsive to edits made in the simulated runtime view, wherein the computer program product changes only the acceptable invalid syntax corresponding to an edited portion of the simulated runtime view, and wherein acceptable invalid syntax not within the edited portion is preserved.

41. The computer program product of claim 38 further comprising:

code for correcting all invalid language syntax responsive to a preselected choice made by a user.

42. The computer program product of claim 32 wherein the language is HTML.

43. The computer program product of claim 32 wherein the language is DHTML.

44. The computer program product of claim 32 wherein the language is XML.

45. A computer system for modifying a program written in a language, the system comprising:

software that verifies program structure, wherein the program structure comprises language syntax and code relations;

software that determines preservable invalid program structure, wherein said preservable invalid structure is defined by invalid nesting of individual program elements, and wherein said preservable invalid program structure is executable; and software that edits the program, wherein edits made to preservable invalid program structure are implemented with valid program structure formulated responsive to an internal set of programming rules, and wherein preservable invalid structure not within a portion of the program edited is maintained.

46. The system of claim 45 further comprising:

software that simultaneously displays the program to a user in a text mode which presents the program in a text view and in a visual mode which presents the program in a graphical view.

47. The system of claim 46 wherein the system preserves formatting parameters in the program when the program is one of loaded and stored, wherein formatting parameters comprise instructions that control the visual layout of the text view as displayed to the user.

48. The system of claim 46 wherein the editing software allows a user to make at least one of edits and selections in one view of the text view and the graphical view, such that the at least one edits and selections in the one view are applied in both views.

49. The system of claim 48 further comprising:

software that changes the formatting parameters of a portion of the text view edited in the graphical view.

50. The system of claim 46 further comprising:

a format table comprising a list of formatting parameters pre-selected by a user.

51. The system of claim 50 wherein the system generates new programs in the text view and graphical view in accordance with the format table.

52. The system of claim 50 wherein the editing software changes the program structure of a portion of the text view edited in the graphical view.

53. The system of claim 50 wherein invalid program syntax is displayed differently that valid program syntax.

54. The system of claim 45 wherein the verification software provides a user an option to automatically correct the invalid program structure.

55. The system of claim 46 further comprising:

a software routine that parses the program into a tree structure, wherein the tree structure comprises a plurality of nodes.

56. The system of claim 55 wherein each of the plurality of nodes corresponds to a portion of the program.

57. The system of claim 56 wherein formatting parameters of a portion of the program are stored in the nodes corresponding to that portion, wherein the tree structure is used to preserve the formatting of the program.

58. The method of claim 45 wherein the language comprises HTML.

59. The method of claim 45 wherein the language comprises DHTML.

60. The method of claim 45 wherein the language comprises XML.

* * * * *